United States Patent [19]

Komeyasu et al.

[11] 4,386,110
[45] May 31, 1983

[54] ELECTRICAL TREATMENT METHOD OF SOYBEAN PROTEIN

[75] Inventors: Minoru Komeyasu; Yoshisuke Miura; Hiroyoshi Sakai, all of Hiroshima, Japan

[73] Assignee: Hiroshima Prefecture, Hiroshima, Japan

[21] Appl. No.: 338,575

[22] Filed: Jan. 8, 1982

[51] Int. Cl.³ .............................................. C25B 3/04
[52] U.S. Cl. .................................. 426/244; 204/131; 426/237
[58] Field of Search ............... 204/131; 426/237, 244, 426/247

[56] References Cited

U.S. PATENT DOCUMENTS

| | | | |
|---|---|---|---|
| 1,915,568 | 6/1933 | Gortner et al. | 204/131 |
| 2,232,052 | 2/1941 | Cummins | 426/244 |
| 2,400,951 | 5/1946 | Reid | 426/237 |
| 2,516,733 | 7/1950 | Unshuld | 426/237 |
| 4,119,506 | 10/1978 | Bashforth | 204/131 |

FOREIGN PATENT DOCUMENTS 22151 of 1913 United Kingdom ................ 204/131

OTHER PUBLICATIONS

"Soybean Globulins" by Koshiyama et al., Proceedings of Symposium of Akademie der Wissenschaften der DDR, Seed Proteins, N 4, p. 21 (1978).
"Food Processing Characteristics of Soybean 11 S & 7 S Proteins", Agr. Biol. Chem., vol. 33, No. 9, pp. 1301-1308 (1969).
"Food Processing Characteristics of Soybean Proteins", Agr. Biol. Chem., vol. 35, No. 6, pp. 890-898.

Primary Examiner—R. L. Andrews
Attorney, Agent, or Firm—Koda and Androlia

[57] ABSTRACT

An electrical treatment method for soybean protein is performed in such a manner that a mixture of soybean protein and solvent is set in a first electrolytic tank having a cathode and solvent is set in a second electrolytic tank which is separated from above electrolytic tank by a diaphram or a salt bridge and is provided with an anode and DC voltage is given between the two electrodes for electrolytic treatment for soybean protein. The soybean protein's quality can be significantly improved.

3 Claims, 2 Drawing Figures

ELECTRICAL TREATMENT METHOD OF SOYBEAN PROTEIN

BACKGROUND OF THE INVENTION

1. Field of the Invention

The present invention relates to an electrolytic treatment method for soybean protein, and more particularly to an electrolytic treatment for imporving the quality of soybean's property during soybean processing.

2. Prior Art

Soybean protein has been used as a material for being processed into various types of food such as tofu (bean curd). In the processing, it is always important to maintain the quality of soybean protein in terms of solvability, gellation level and the like. Such quality control must be particularly kept up in connection with the conditions of transportation, storage, etc. In practice, these conditions vary. It has been unavoidable for soybean protein to deteriorate somewhat. The degree of deterioration depends upon different factors such as humidity, temperature, period of storage or transportation. Therefore, the degree of deterioration varies from the highest to the lowest when a factory receives the soybeans.

In addition, it is very difficult to determine the degree of deterioration by appearance. This makes it almost impossible to adjust the conditions of processing and to compensate for such deterioration.

As a result, the soybean processing in the prior art has been very inefficient and the quality of the processed food has been relatively poor.

SUMMARY OF THE INVENTION

Accordingly, it is a primary object of the present invention to resolve the above problems which the prior art has failed to solve.

It is another object of the present invention to provide a simple and economical method for improving the quality of soybeans.

The above-mentioned features and objects of the present invention are accomplished by a unique electrolytic treatment method. The method is characteristically achieved in such a manner that soybean protein dissolved in extracting solution is placed in an electrolytic tank having a cathode and extracting solution or solvent is placed in a second electrolytic tank separated by a diaphram or salt bridge. The second tank is provided with an anode. The two tanks are so connected that DC voltage between the two electrodes may be given to achieve the electrolytic treatment to the soybeans.

BRIEF DESCRIPTION OF THE DRAWINGS

The above-mentioned features and objects of the present invention will become more apparent with reference to the following description taken in conjunction with the accompanying drawings wherein like reference numerals denote like elements, in which.

DETAILED DESCRIPTION OF THE INVENTION

Figure 1:
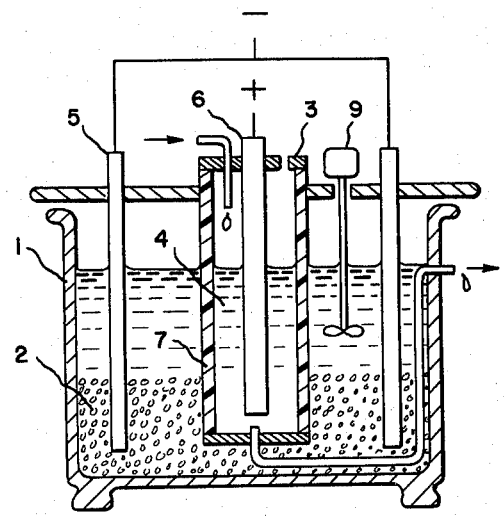
FIG. 1 is a schematic elevational view of an apparatus for performing the electrolytic treatment of this invention.

Referring more particulary to the Figures, shown therein is the apparatus including electrolytic tanks to perform the electrolytic treatment for soybean protein of this invention. The structure of the apparatus shown in Figures is substantially the same except that in the apparatus of FIG. 1, a diaphram is employed to separate a cathode electrolytic tank from an anode electrolytic tank, while the apparatus of FIG. 2 uses a salt bridge to separate the two tanks. Namely, a cathode electrolytic tank 1 is provided with a cathode 5, while an anode electrolytic tank 3 is provided with an anode 6. The two electrolytic tanks 1 and 3 are designed so as to be separated from each other by diaphram 7 (FIG. 1) or salt bridge 8 (FIG. 2).

In the cathode electrolytic tank 1 is set a mixture including soybean protein material and extracting solution or soybean protein solution 2. On the other hand, the anode electrolytic tank 3 is filled with extraction solution or solvent 4.

DC current is provided between the cathode 5 and anode 6. If the solvent in the cathode electrolytic tank 1 is stirred with a stirrer 9 continuously exchanging the solvent in the anode electrolytic tank 3 and electricity is applied to the two electrodes 5 and 6, the electrolytic treatment efficiency may be improved and also the size of the anode electrolytic tank 3 may be reduced.

Described hereunder are the examples of this invention.

EXAMPLE 1

With the apparatus shown in FIG. 2, 3 kg of commercially available defatted soybeans were extracted by 20 kg of water for three hours. 100V-1A current was supplied between the cathode 5 and anode 6 exchanging the water in the anode electrolytic tank 3 at the rate of 5 cc per minute. A carbon bar was used as electrodes 5 and 6. The salt bridge 8 included 0.5 mole of sodium chloride and two percent of agar gel.

Two groups of defatted soybeans were prepared: one group was of the soybeans to which the electrolytic treatment had been applied and the other group was of the soybeans to which such treatment had not been applied. Then, the amount of soybean protein extracted into the water was measured and the specific composition of the protein was determined for each group of soybeans by ultra-centrifugal-sedimentation analysis and gel-chromatography.

It was acknowledged that the soybean with the electrolytic treatment showed 5 to 20 percent of increased amount of soybean protein dissolved into the water and also demonstrated an increase of 11 S component or protein which is known to perform the highest gel-formative function.

EXAMPLE 2

Figure 2:
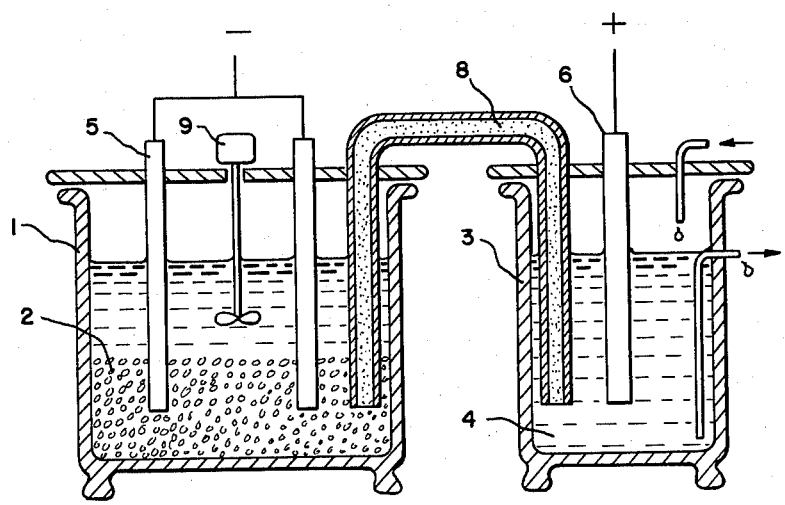
FIG. 2 is a schematic elevational view of another type of apparatus for performing the electrolytic treatment of this invention.

With the apparatus shown in FIG. 1, 7 kg of Ohio soybeans produced in the United States which had been harvested one year prior to this experiment were immersed in 20 kg of water for ten hours. The electricity given to the electrolytic treatment was 70 V - 500 mA and the water in the anode electrilytic tank 3 was exchanged at the rate of 30 cc per minute. Stainless steel pipes were employed as the electrodes 5 and 6 and a cylinderical bisque was used as the diaphram 7.

The Ohio soybeans were divided into two groups: one group was of the soybeans with the electrolytic treatment and the other group was of the soybeans without such treatment. Then, two types of tofu; namely, kinugoshi-tofu (fine texture) and momen-tofu (rough texture) were made from the soybeans of the two groups under the same condition. The amount of tofu obtained, the amount of gel and glutamic acid content were thereafter measured.

It was found that kinugoshi-tofu made from the soybeans with the electrolytic treatment had a 10-15 percent increase in the gel amount and 15-20 percent increase in its glutamic acid content and also had a better taste when compared to kinugoshi-tofu made from the soybeans without the electrolytic treatment. No difference was recognized between them in the amount of tofu obtained. It is further found that momen-tofu made from the soybeans with the electrolytic treatment had an increase in the amount of tofu by 10-20 percent and the glutamic acid content by 5-10 percent and had a better taste when compared with other types of momen-tofu made from soybeans without the electrolytic treatment. No difference in the gel amount was recognized between the two types of momen-tofu.

EXAMPLE 3

With the apparatus shown in FIG. 2, the electrolytic treatment with the electricity of 90 V - 700 mA was given to 20 kg of liquified soybean protein which was obtained by a conventional method. The liquified protein is normally used to produce fried bean curd. 15 kg of water was placed in the anode electrolytic tank 3. This time, the water was not exchanged.

Under the same condition, two types of fried bean curds were made: one was made from the liquified soybean protein to which the electrolytic treatment had been given and the other was made from the liquified soybean protein to which such treatment had not been given. Then, the quality of the fried bean curds thus made were examined and compared.

It was observed that the fried bean curd with the electrolytic treatment had a better taste and even texture in comparison to the fried bean curd without the electrolytic treatment.

We claim:

1. An electrolytic treatment method for soybean protein to improve its quality and to decrease its deterioration comprising:
    setting a mixture of soybean protein and solvent in a first electrolytic tank having a cathode;
    setting solvent in a second electrolytic tank having an anode which is separated from said first electrolytic tank; and
    supplying DC voltage between said anode and cathode and through an ionic flow means between said first and second tanks.

2. An electrolytic treatment method according to claim 1, wherein said said ionic flow means comprises a diaphram separating said first and second tanks from each other.

3. An electrolytic treatment method according to claim 1, wherein said ionic flow means comprises a salt bridge.

* * * * *